United States Patent [19]
Shiets

[11] Patent Number: 4,571,795
[45] Date of Patent: Feb. 25, 1986

[54] APPARATUS FOR REBUILDING VEHICLE AXLES

[76] Inventor: Leo C. Shiets, 560 S. State Rte. 19, Fremont, Ohio 43420

[21] Appl. No.: 624,613

[22] Filed: Jun. 26, 1984

Related U.S. Application Data

[62] Division of Ser. No. 339,622, Jan. 15, 1982, Pat. No. 4,455,732.

[51] Int. Cl.[4] .................. B23P 7/00; B23B 45/14
[52] U.S. Cl. .................... 29/26 B; 408/111; 408/712
[58] Field of Search .............. 29/26 A, 26 B, 56.5; 408/712, 72 R, 88, 102, 111, 99, 100, 79, 106; 409/178; 82/4 R, 4 C

[56] References Cited

U.S. PATENT DOCUMENTS

| | | | |
|---|---|---|---|
| 2,847,881 | 8/1958 | Alleman | 29/26 A X |
| 3,131,583 | 5/1964 | Hanley et al. | 408/79 |
| 3,810,710 | 5/1974 | Ennemoser | 408/111 |
| 3,880,544 | 4/1975 | Papadopulos | 408/111 |
| 3,884,592 | 5/1975 | Shulters | 408/106 X |
| 4,011,024 | 3/1977 | Naicano et al. | 408/712 X |
| 4,090,805 | 5/1978 | Grimsley | 409/178 X |
| 4,414,869 | 11/1983 | Augustine | 82/4 R |

Primary Examiner—William R. Briggs
Attorney, Agent, or Firm—Willian Brinks Olds Hofer Gilson & Lione

[57] ABSTRACT

An apparatus for rebuilding vehicle axles permits rapid repair at the failure site. The rebuilding apparatus includes a substantially conventional boring machine having specially configured mounting components which facilitate securement of the apparatus to various axle structures. Such components include a plurality of mounting plates, one of which is selected to match the bolt circle pattern on a specific axle. The plate is secured to the axle and the boring machine is secured to the plate. Vertical and horizontal adjustment devices facilitate accurate alignment of the boring tool with the vehicle axle.

4 Claims, 10 Drawing Figures

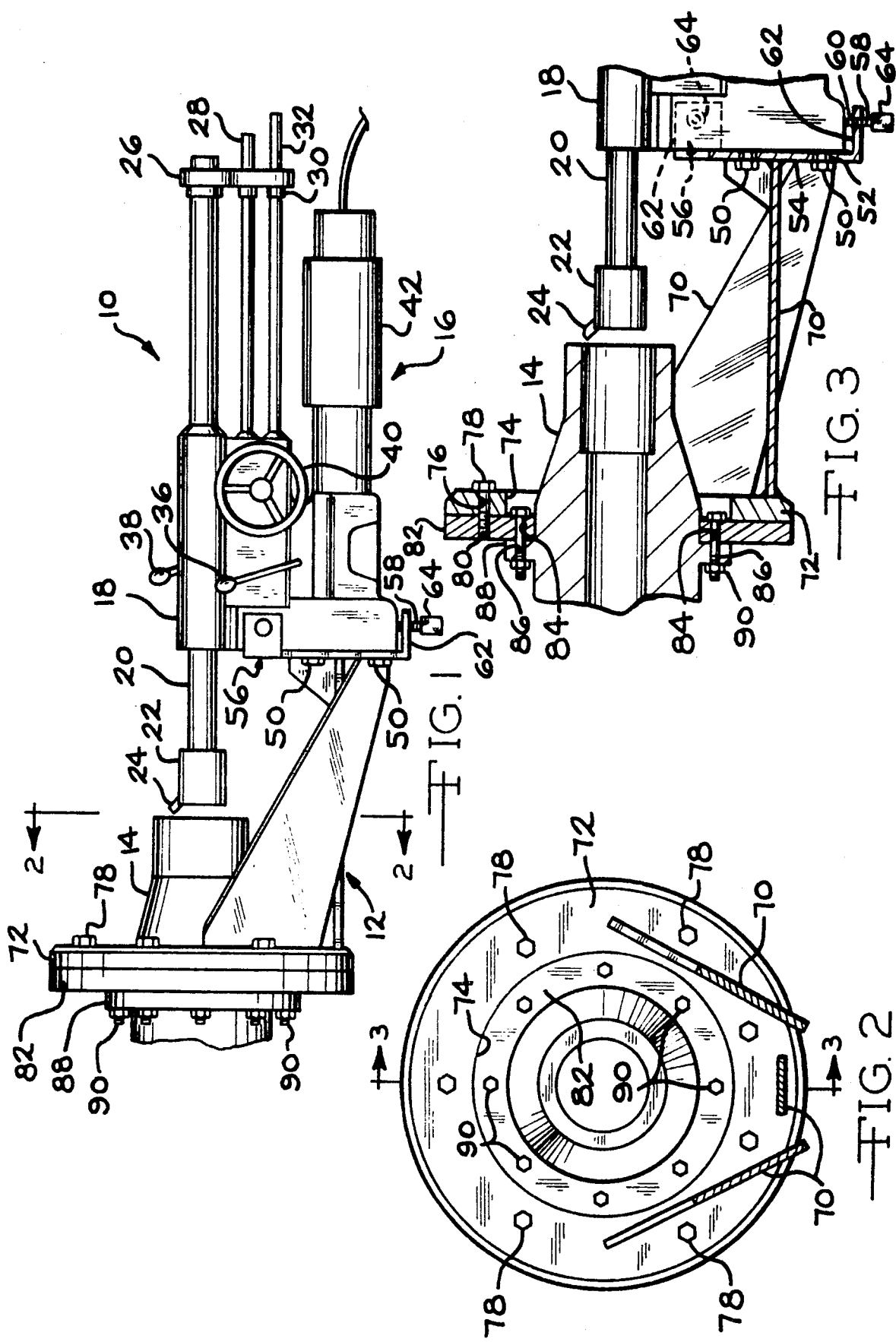

APPARATUS FOR REBUILDING VEHICLE AXLES

This is a division of application Ser. No. 339,622 filed Jan. 15, 1982, now U.S. Pat. No. 4,455,732.

BACKGROUND OF THE INVENTION

The invention relates generally to axle repair methods and apparatus and more specifically to a method and apparatus for repairing vehicle axles at the failure site.

Long haul trucking is perhaps the mainstay of the American material and goods transportation system. In addition to the obvious flexibility of routes and accessibility to receiving and delivery sites provided by local and state roads, the interstate highway system has added speed to the aforementioned benefits. The annual distances which such highways encourage equipment to travel in a year is accompanied by a requirement that the equipment undergo significant preventative maintence or suffer significant repair and replacement costs.

A mechanical structure of such trucks especially sensitive to the significant mileage often traveled by these vehicles is the axle and wheel bearing assemblies. Unfortunately, although such components are as indispensable as many other more obvious and visible components such as spark plugs and tires, they may be overlooked until they fail. A bearing failure will generally disable the vehicle immediately and it must be towed to a site where repair can be performed. Occasionally, a wheel bearing that has failed can simply be replaced. More often, however, the bearing failure will result in damage to the bearing surface on the axle before it is detected and it may be necessary to replace an entire axle due to the damage caused by the failed bearing.

SUMMARY OF THE INVENTION

The instant method and apparatus comprehends means whereby a damaged vehicle axle can be repaired without either requiring that the vehicle be towed to wherever machine shop services are available or requiring that the entire axle be replaced.

The method comprehends the removal of the damaged terminal portion of an axle, including the bearing surfaces, and its replacement with a stub axle section having the necessary bearing surfaces and threads. The damaged axle section is first removed by sawing or other appropriate method and a boring apparatus according to the instant invention is then secured to a brake flange or similar radially extending lip on the remaining portion of the axle. The boring machine tool axis is aligned with the axis of the axle and a cylindrical cavity is bored into the end of the axle. Next, the end of the axle is chamfered and radially oriented passageways which intersect the bored cavity are cut through the wall of the axle. A sub axle portion having appropriately disposed bearing surfaces and a centrally disposed axial passageway is then driven into the cavity. Finally, the axle stub is secured to the axle proper by weldments disposed within the plurality of radially oriented passageways.

The instant method thus provides a direct and straight-forward scheme whereby vehicle axles having damaged threads or bearing surfaces may be completely restored without the expense attendant either replacement of the complete axle or towing of the vehicle to a distant machine shop or repair facility.

The boring apparatus of the instant invention includes a substantially conventional axial boring machine having manually selectable feed rates and directions and which is powered by electricity. The boring apparatus includes specially configured mounting components which adapt and facilitate securement of the boring apparatus to a brake flange or other radially oriented structure on an axle having a plurality of through openings oriented parallel to the axis of the axle and arranged in spaced-apart increments about a circle. The mounting components of the boring machine include a fixed plate and a planar annulus secured to the fixed plate which abuts the brake flange or similar structure of the axle noted above. The use of several annuli which each include a plurality of openings arranged in various circumferential and radial patterns which are intended to align with a variety of opening patterns in the axle flanges of various manufacturers is contemplated.

The boring apparatus according to the instant invention thus provides a broadly adaptable machine for boring concentric cylindrical cavities in the ends of axles in association with the steps of the instant disclosed method.

Thus it is an object of the instant invention to provide a method and apparatus for rebuilding vehicle axles having damaged bearing or threaded surfaces.

It is a further object of the instant invention to provide a method and apparatus for repairing damaged vehicle axles which can be utilized at the site of the failure.

It is a still further object of the instant invention to provide an apparatus and method for repairing vehicle axles which obviates replacement of the entire axle assembly.

It is a further object of the instant invention to provide a method and apparatus for repairing damaged vehicle axles which is both uncomplicated and rapid.

Further objects and advantages of the instant invention will become apparent by reference to the following description of the preferred embodiment and appended drawings.

BRIEF DESCRIPTION OF THE DRAWINGS

FIG. 1 is a side elevational view of an axle boring apparatus according to the instant invention in place on an axle;

FIG. 2 is a full sectional view of an axle boring apparatus according to the instant invention taken along line 2—2 of FIG. 1;

FIG. 3 is a full sectional view of an axle boring apparatus according to the instant invention taken along line 3—3 of FIG. 2;

DESCRIPTION OF THE PREFERRED EMBODIMENT

Figure 4:
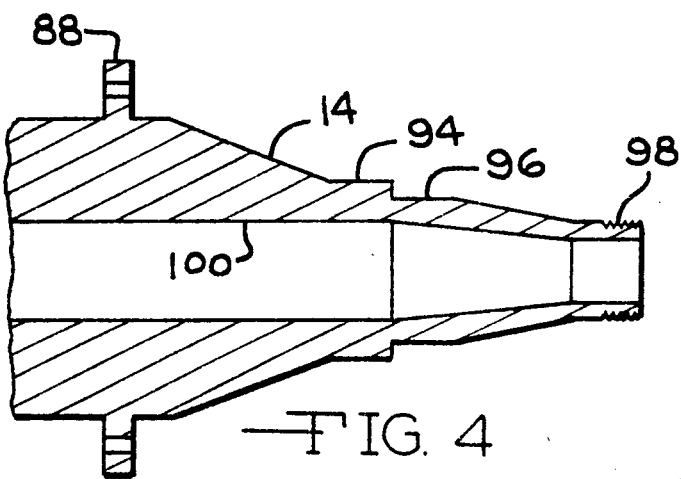
FIG. 4 is a full sectional view of the terminal portion of a damaged vehicle axle.

Referring now to FIGS. 1 and 2, an axle boring apparatus according to the instant invention is illustrated and generally designated by the reference numeral 10. The axle boring apparatus 10 comprises an adjustable mounting assembly 12 which is adaptable to mount the axle boring apparatus 10 on a variety of motor vehicle axles 14 as will be more fully described subsequently and a boring machine assembly 16. The boring machine assembly 16 includes a housing 18 which generally provides mounting for and protects the various conventional drive components (not illustrated) of the boring machine assembly 16. As noted, the boring machine assembly 16 is substantially conventional and includes a boring sleeve 20, a boring spindle 22 disposed concentrically within the boring sleeve 20 and a cutter or tool bit 24 which is removably secured to the end of the boring spindle 22. The boring sleeve 20 is slidably received within a suitable opening in the housing 18 and is stabilized at its end opposite the tool bit 24 by a drive housing 26. The drive housing 26 includes means such as a belt (not illustrated) which transfers power from a drive shaft 28 to the boring spindle 22. The drive housing 26 also includes a threaded bushing 30 within which is received s complementarily threaded lead screw 32. The housing 18 also includes power transmission components (not illustrated) to which a gear shift lever 36, a feed control lever 38 and a hand wheel 40 are mechanically coupled. The gear shift lever 36 selects either a high or low drive ratio, the feed control lever 38 selects forward, neutral or reverse directional drive of the boring spindle 22 and the hand wheel 40 permits manual positioning of the boring spindle 22. The boring machine assembly 16 is driven by an electric motor 42 or similar means. The boring machine assembly 16 may be like or similar to the model FWS-II manufactured by the Kwik-Way Manufacturing Company of Marion, Iowa.

Referring now to FIGS. 1 and 2, the adjustable mounting assembly 12 is secured to the boring machine assembly 16 by a plurality of bolts 50 which extend through openings 52 in a plate 54. The openings 52 have a diameter substantially larger than the diameter of the bolts 50 in order to permit vertical and lateral adjustment of the position of the boring machine assembly 16 relative to the adjustable mounting assembly 12 by three adjustment assemblies 56. Precise vertical positioning of the boring machine assembly 16 relative to the adjustable mounting assembly 12 is provided by one of the adjustment assemblies 56 which includes a threaded adjustment screw 58. The threaded adjustment screw 58 is received within a complementarily threaded opening 60 in an ear 62 which is an extension of the mounting plate 54. The threaded adjustment screw 58 may include a knurled head 62 which facilitates manual engagement. Rotation of the threaded adjustment screw 58 in a clockwise direction will raise the boring machine assembly 16 relative to the adjustable mounting assembly 12 and vice versa. A pair of opposed adjustment assemblies 56, one of which is illustrated in both FIGS. 1 and 3, provide horizontal, i.e., lateral, adjustment of the position of the boring machine assembly 16 relative to the adjustable mounting assembly 12.

With reference to FIGS. 1, 2 and 3, it will be appreciated that secured to the mounting plate 54 by welding or other suitable fastening means are three planar support members 70 which are similarly secured at their opposite ends to an annular plate 72. The annular plate 72 defines a concentrically disposed central opening 74 and a plurality of smaller openings 76 disposed thereabout. Each of the smaller openings 76 receives a bolt 78 which extends through the annular plate 74 and is received within a complementarily threaded aligned opening 80 disposed in an annular match plate 82. The annular match plate 82 may be a selected one of a plurality of match plates 82 having a second plurality of openings 84 which are arranged to align with a particular pattern and size of openings 86 arranged in a spider flange 88 of an axle 14 of a particular vehicle manufacturer. The spider flange 88 designates a flange or similar structure on an axle 14 to which the brake shoes (not illustrated) and other stationary components of the brake assembly are secured to the axle 14. It is contemplated that a plurality of match plates 82 will be available to the user of the axle boring apparatus 10 of the instant invention so that any particular configuration of openings 86 within any spider flange 88 may be matched such that the boring machine apparatus 10 may be readily and properly secured to any axle 14. The adjustable mounting assembly 12 finally also includes a suitable plurality of bolt and nut assemblies 90 which may be utilized to secure the match plate 82 to the spider flange 88.

Figure 5:
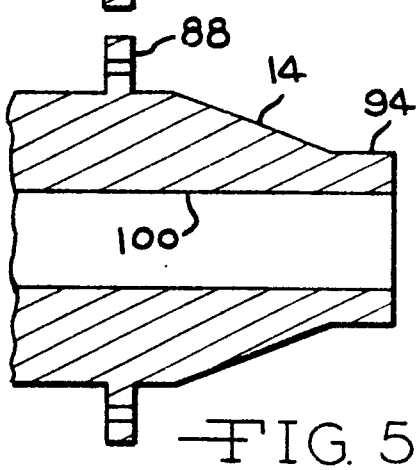
FIG. 5 is a full sectional view of a portion of a vehicle axle with the damaged terminal portion removed.

Referring now to FIGS. 4 through 10, the method of axle repair according to the instant invention will be described. First of all, with reference to FIG. 4 it will be appreciated that a conventional axle 14 includes the spider flange 88 as previously noted, an oil seal surface 94, a pair of coaxial but axially spaced apart bearing surfaces 96 and a threaded portion 98 adjacent the terminus of the axle 14. The axle 14 also defines a central passageway 100 through which a drive shaft (not illustrated) extends. In a typical axle requiring rebuilding, the bearing surfaces 96, the threaded portion 98 or both regions may be damaged due to bearing failure or some other cause. As illustrated in FIG. 5, the axle 14 is thus cut by conventional techniques such as a saw between the oil seal surface 94 and the immediately adjacent bearing surface 96 and the cut portion of the axle 14 is removed.

Figure 6:
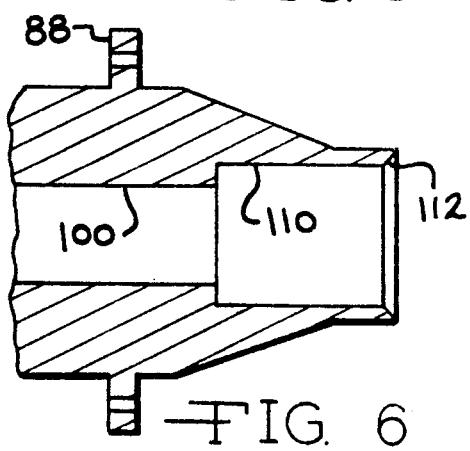
FIG. 6 is a full sectional view of a portion of a vehicle axle after a cylindrical cavity has been bored therewithin.

Referring now to FIGS. 1 and 6, the adjustable mounting assembly 12 and specifically the match plate 82 is secured to the axle 14 by the bolts 90. Next the entire axle boring apparatus 10 is secured to the match plate 82 by aligning the openings 78 of the annular plate 72 with the threaded openings 80 in the match plate 82 and engaging and tightening the threaded fasteners or bolts 78. Before the cavity 110 is formed within the end of the axle 14, the concentricity or runout of the cutter or tool bit 24 relative to the passageway 100 must be checked. If the tool bit 24 is not properly aligned with the passageway 100, the bolts 50 may be slightly loosened and the adjustment mechanisms 56 may be moved appropriately to adjust the vertical and horizontal position of the boring machine assembly 16 relative to the axle 14. Once concentricity has been achieved the bolts 50 are re-tightened. Boring of the cavity 110 may then proceed according to conventional boring practices and techniques. It has been found preferable to also cut or form a chamfered edge 112 adjacent the end of the axle 14. The chamfered edge 112 may be formed by the use of the axle boring apparatus 10 or other suitable means. At the completion of the boring procedure, the axle boring apparatus 10 may be quickly and efficiently removed from the axle 14 by simply removing the bolt and nut assemblies 90 from the spider flange 88 and withdrawing the apparatus 10 from the end of the axle 14.

Figure 7:
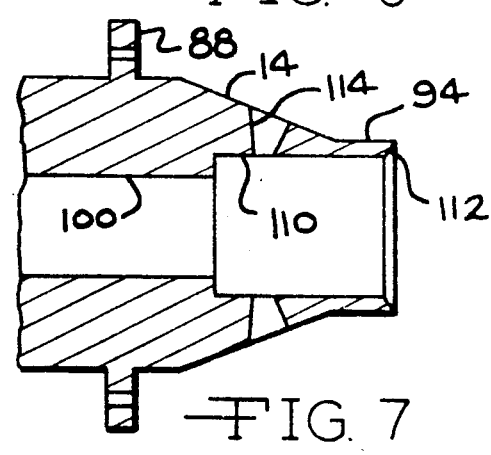
FIG. 7 is a full sectional view of a portion of a vehicle axle after radial passageways which intersect the cylindrical cavity have been drilled therein.

Referring now to FIG. 7, the next step of the repair procedure is to drill or otherwise form a plurality of substantially radial openings or passageways 114 in the wall of the axle 14 between the spider flange 88 and the oil seal surface 94 from the outer surface of the axle 14 to the bored cavity 110. Preferably, the passageways 114 define a conical taper as illustrated in FIG. 7.

Figure 8:
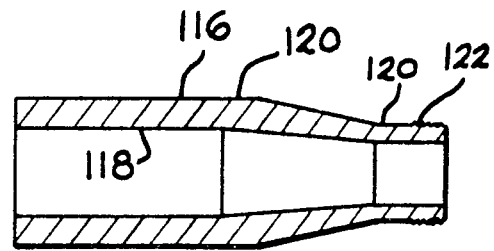
FIG. 8 is a full sectional view of a replacement stub axle.

FIG. 8 illustrates an axle stub 116 defining a central passageway 118, a pair of coaxial, axially spaced-apart bearing surfaces 120 and a threaded terminal portion 122. Comparison of FIGS. 4 and 8 reveals that the stub axle 116 is identical in all respects with the terminal portion of the axle 14, particularly that portion removed. The diameter of the portion of the stub axle 116 opposite the threaded portion 122 is an interference fit with the inside diameter of the bored cavity 110.

Figure 9:
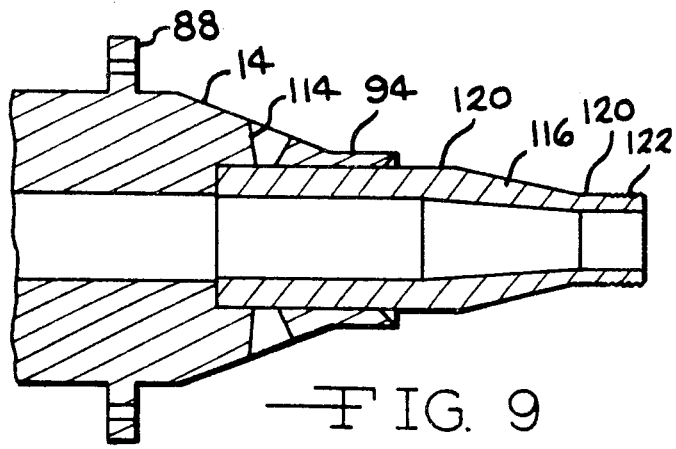
FIG. 9 is a full sectional view of a stub axle in place in the portion of a vehicle axle.

Referring now to FIG. 9, the stub axle 116 is now inserted into the bore cavity 110. Due to the interference fit, it has been found preferable to heat the portion of the axle 14 adjacent the bored cavity 110 in order to enlarge its inside diameter. Likewise, the end of the stub axle 116 opposite the threaded portion 122 may be chilled in order to further facilitate insertion of the stub axle 116 into the bored cavity 110 of the axle 14.

Figure 10:
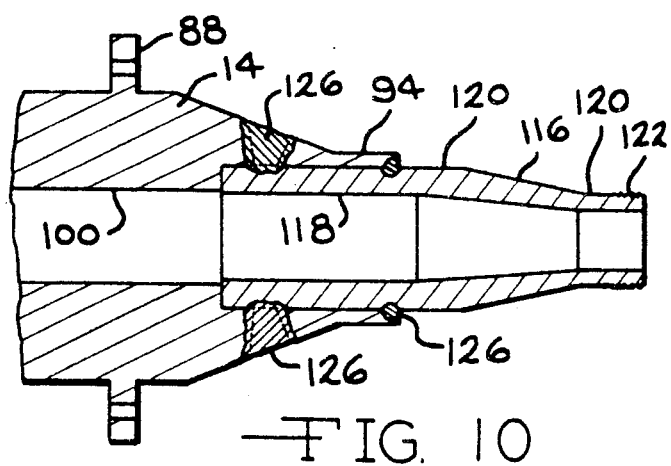
FIG. 10 is a full sectional view of a terminal portion of a vehicle axle repaired according to the instant invention.

With reference to FIG. 10, the final step of the rebuilding procedure comprehends the addition of material 126 by welding or other suitable means within the radial passageways 114 and generally within the triangular cross section region defined by the chamfered edge 112. Such welded material securely retains the axle stub 116 within the axle 14. The radially extending face of the material 126 disposed adjacent the chamfered edge 112 may be ground smooth in order to duplicate the original configuration of the axle 14.

It will thus be appreciated that the apparatus and method of the instant invention provides a means whereby repairs to damaged axles may be readily and rapidly.

The foregoing disclosure is the best mode devised by the inventor for practicing this invention. It is apparent, however, that methods and apparatus incorporating modifications and variations will be obvious to one skilled in the art of axle repair. Inasmuch as the foregoing disclosure is intended to enable one skilled in the pertinent art to practice the instant invention, it should not be construed to include such aforementioned obvious variations and be limited only by the spirit and scope of the following claims.

I claim:

1. An apparatus for facilitating the rebuilding of vehicle axles having flanges disposed adjacent the terminal portion thereof comprising, in combination, a boring machine having a boring cutter and means to rotate and axially translate said boring cutter, and a mounting assembly having a first plate selectively secured to said boring machine, a plurality of adjustment means for providing bi-axial movement of said boring machine relative to said first plate of said mounting assembly, a plurality of braces extending between said first plate and a second plate, said second plate defining a centrally disposed opening suitable for receiving such vehicle axle and a plurality of apertures spaced about said opening, and a third plate disposed adjacent said second plate, said third plate defining a central bore which receives such vehicle axle, a first plurality of apertures arranged in coincidence with said apertures in said second plate for receiving fasteners, and a second plurality of apertures arranged in coincidence with apertures in such vehicle axle flange for receiving fasteners.

2. The apparatus of claim 1 wherein said adjustment means includes a threaded adjustment screw received in a complementarily threaded passage in said first plate.

3. The apparatus of claim 1 wherein said central bore of said third plate has a diameter substantially equal to the diameter of such vehicle axle.

4. The apparatus of claim 1 wherein said third plate is one of a plurality of third plates having different arrangements of said second plurality of apertures disposed to coincide with different arrangements of apertures in such vehicle axle flange.

* * * * *